W. A. WARMAN.
ENGRAVING MACHINE.
APPLICATION FILED JAN. 16, 1911.
1,013,343.
Patented Jan. 2, 1912.
9 SHEETS—SHEET 2.
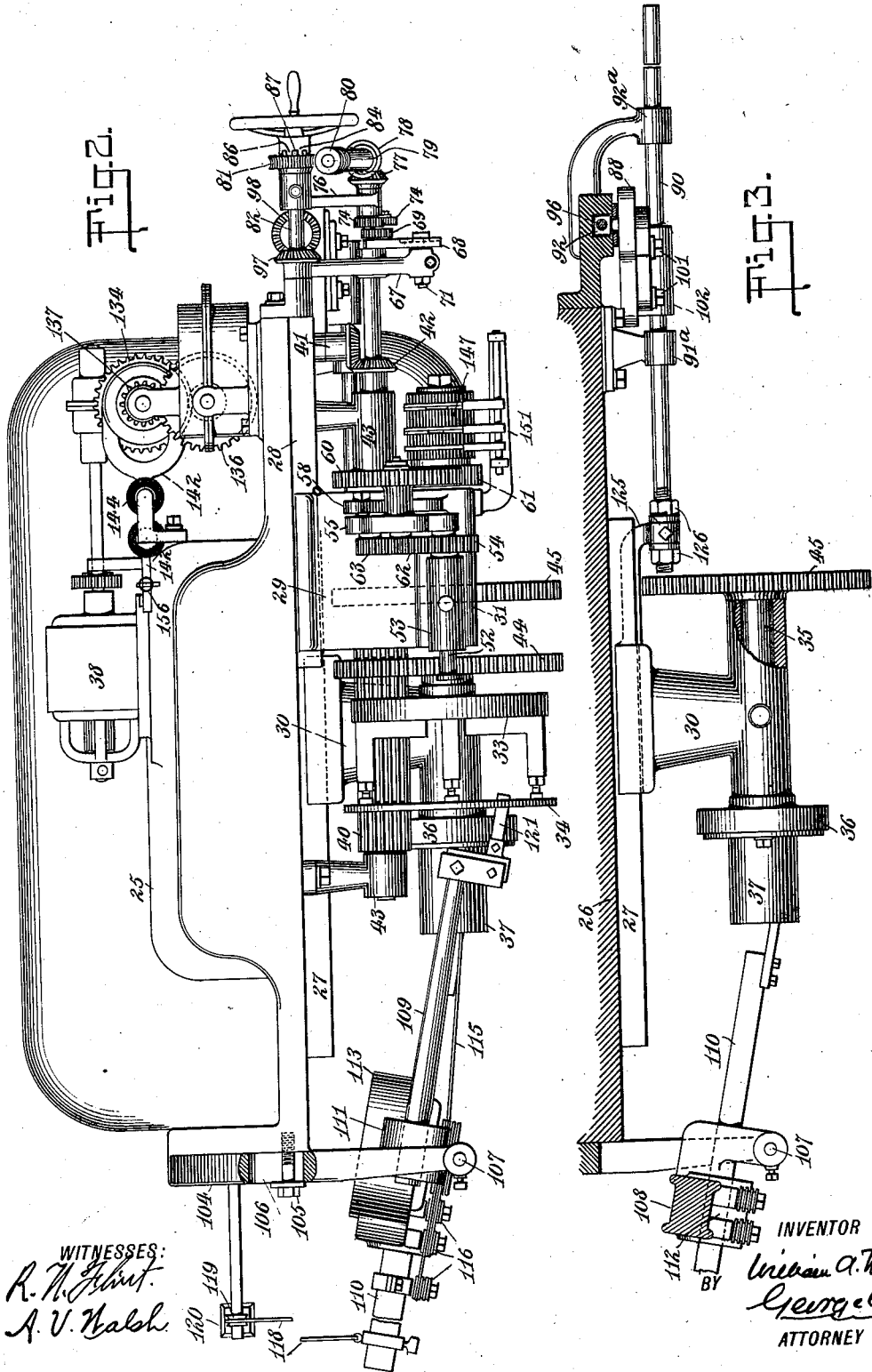
WITNESSES:
R. N. Flint
A. V. Walsh
INVENTOR
William A. Warman
BY George E. Cook
ATTORNEY

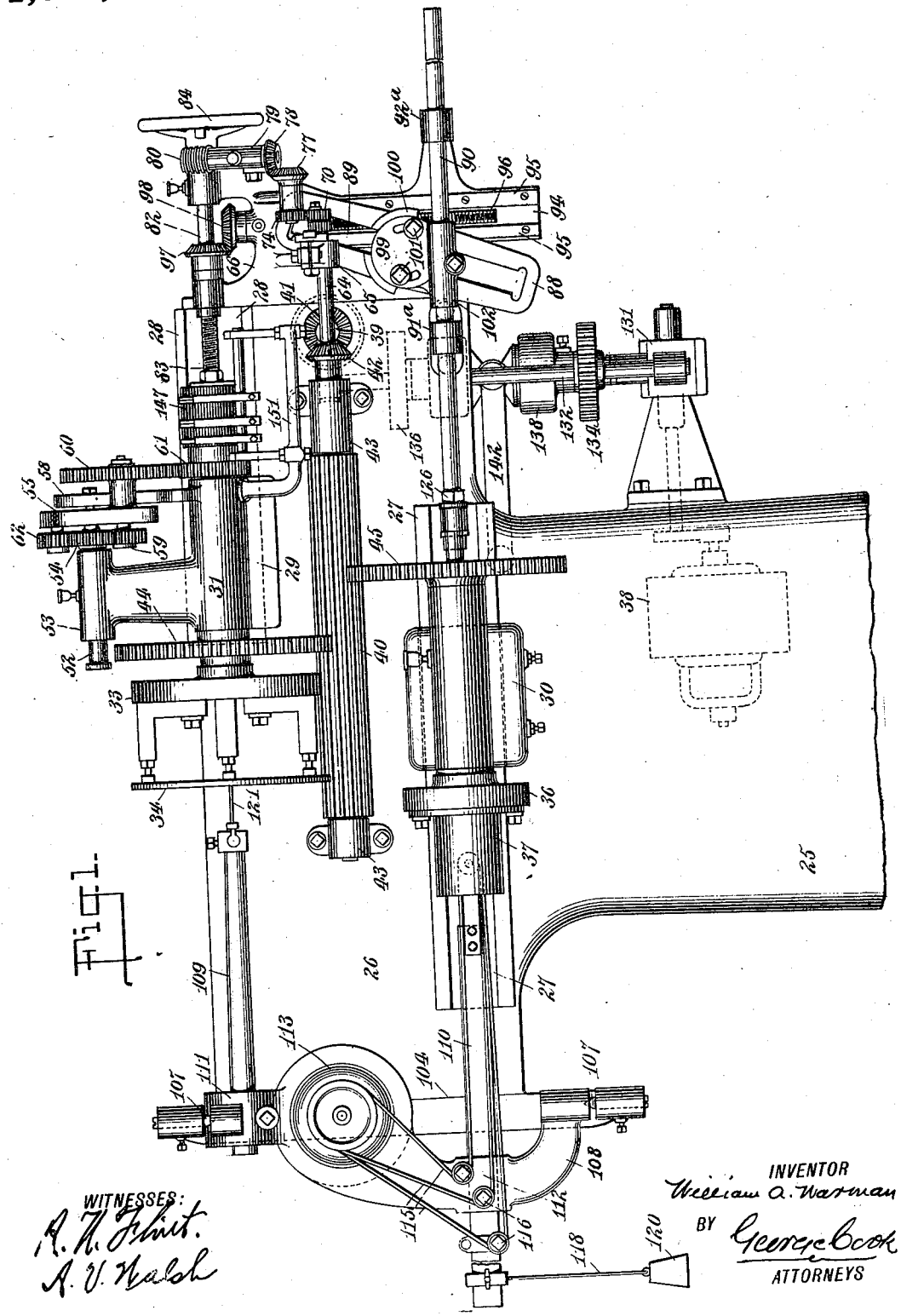

W. A. WARMAN.
ENGRAVING MACHINE.
APPLICATION FILED JAN. 16, 1911.

1,013,343.

Patented Jan. 2, 1912.
9 SHEETS—SHEET 3.

WITNESSES:

INVENTOR
William A. Warman
BY George Bush
ATTORNEY

W. A. WARMAN.
ENGRAVING MACHINE.
APPLICATION FILED JAN. 16, 1911.
1,013,343.
Patented Jan. 2, 1912.
9 SHEETS—SHEET 4.
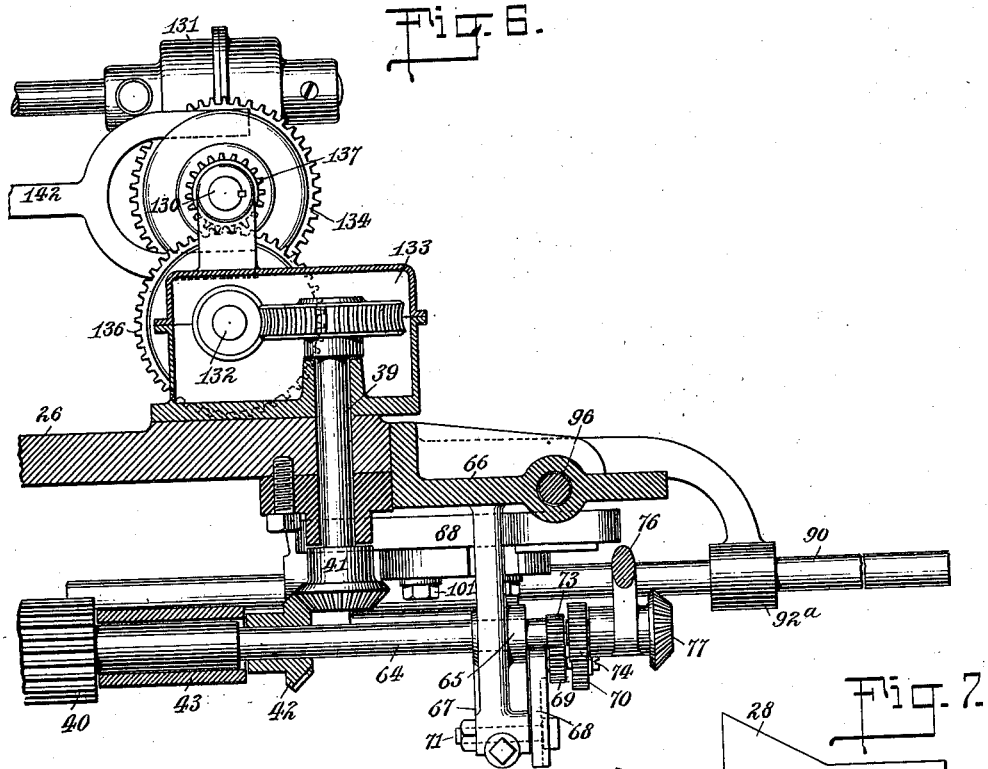
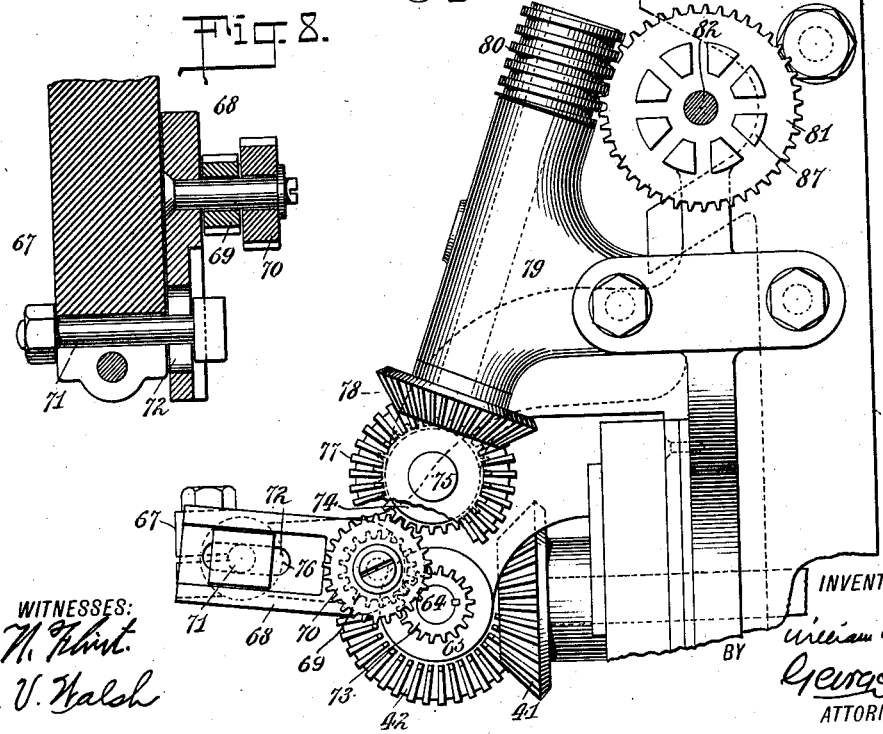
WITNESSES:
INVENTOR
William A. Warman
BY George Cook
ATTORNEY

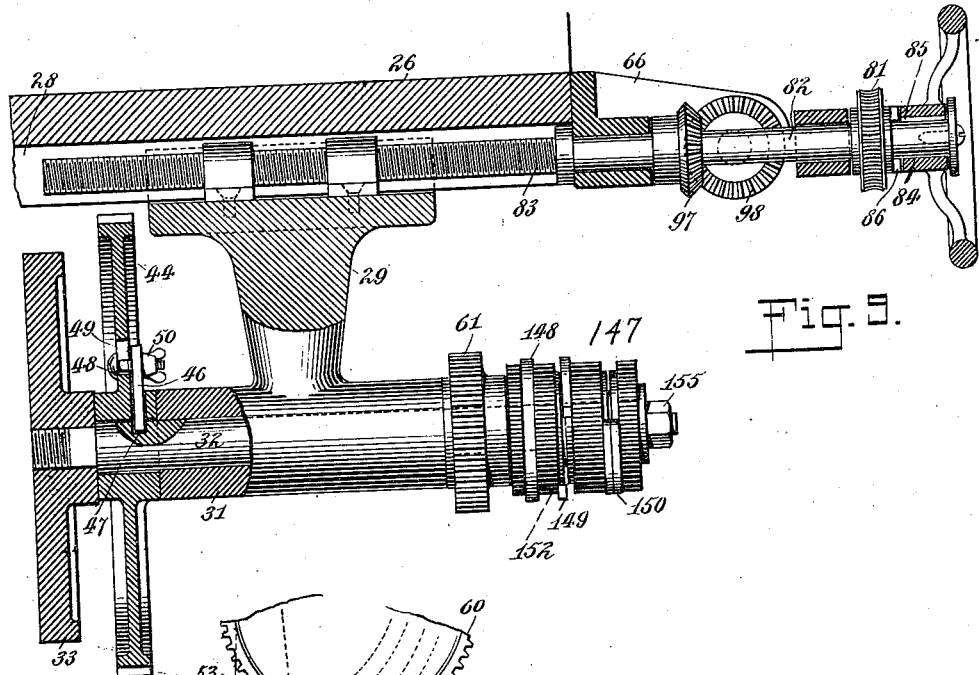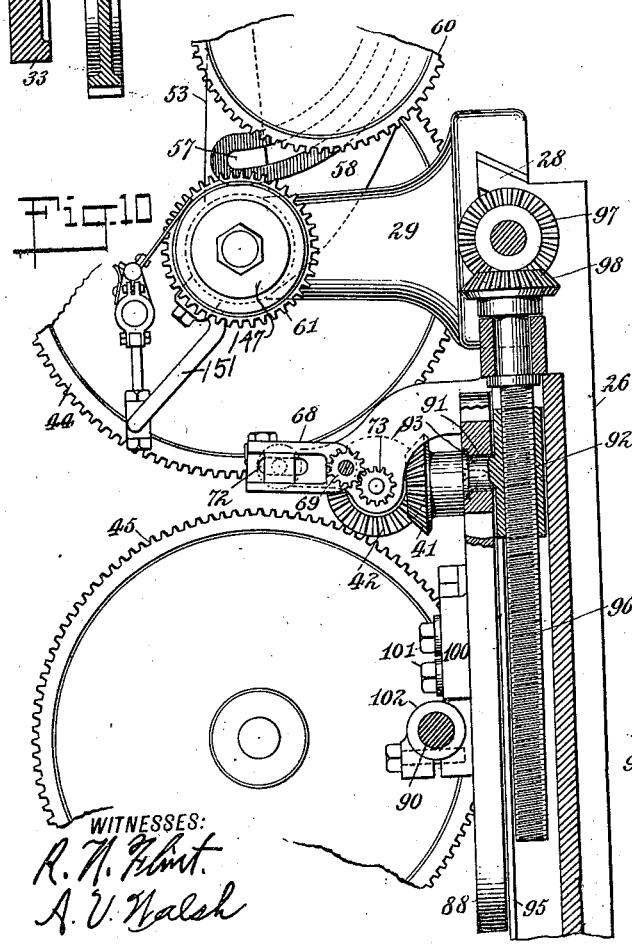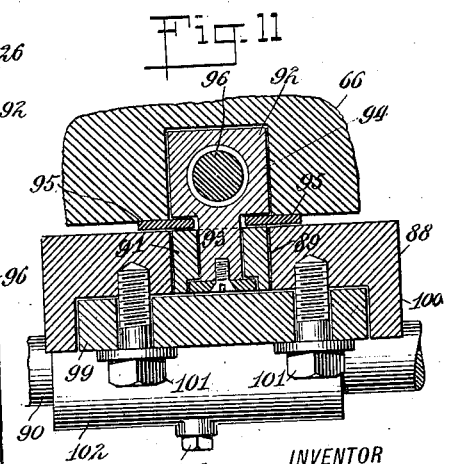

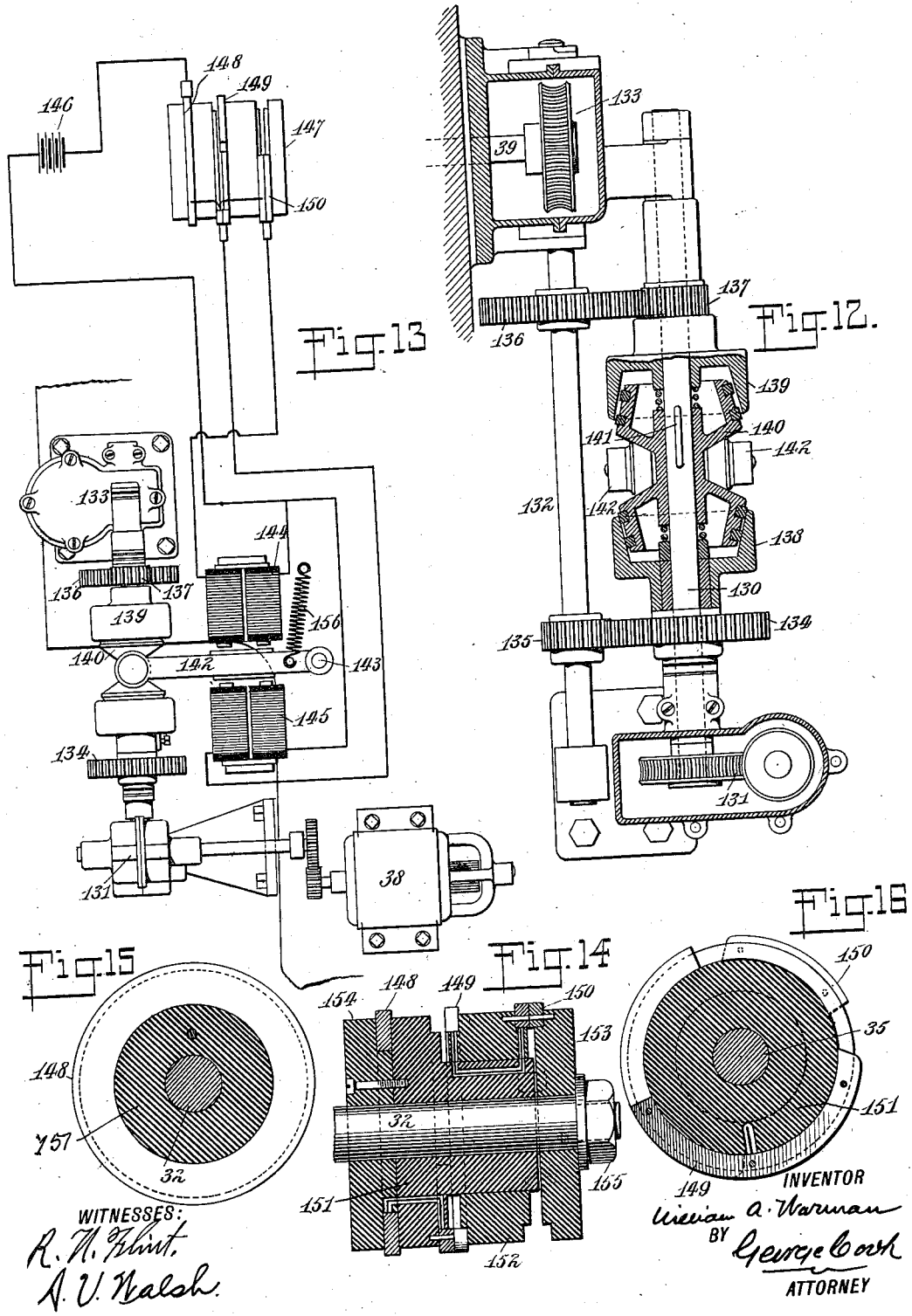

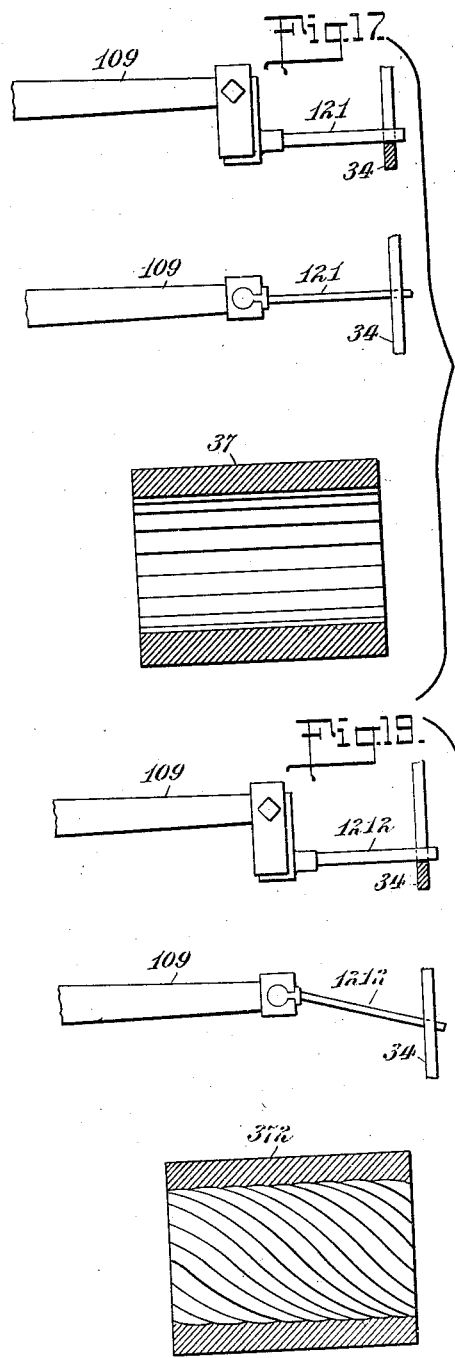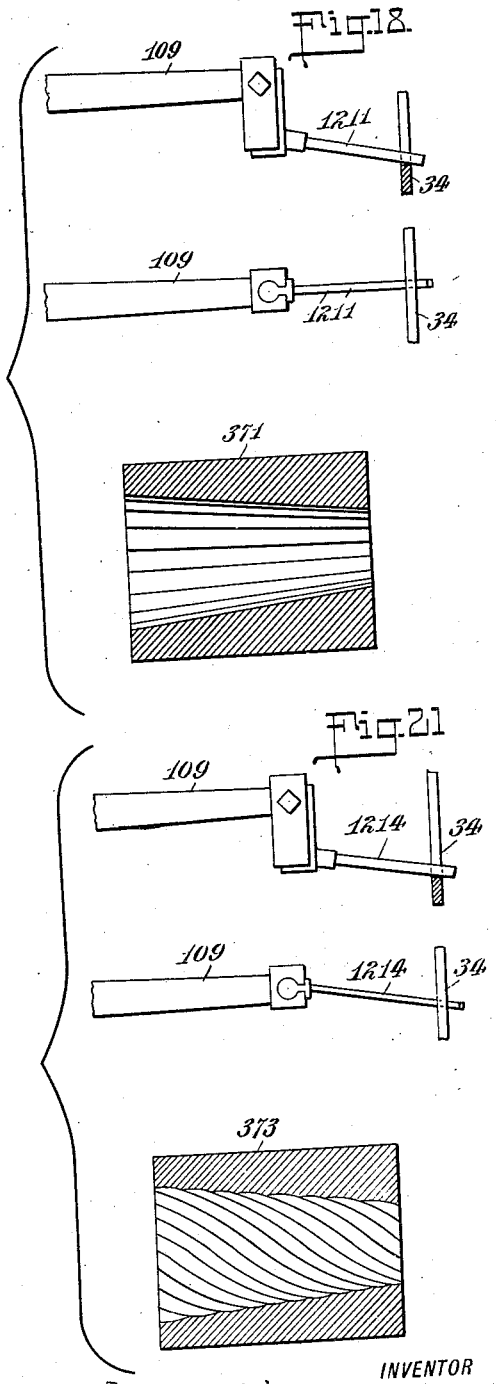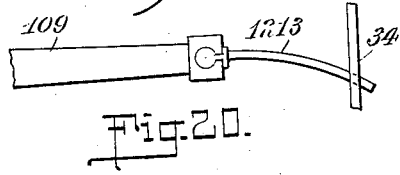

W. A. WARMAN.
ENGRAVING MACHINE.
APPLICATION FILED JAN. 16, 1911.
Patented Jan. 2, 1912.
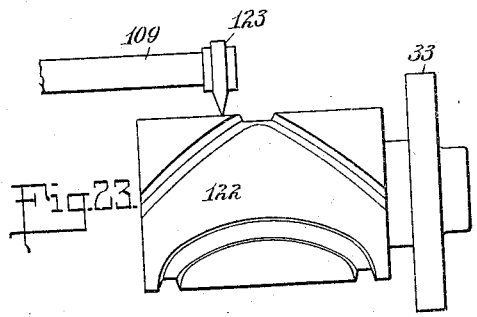
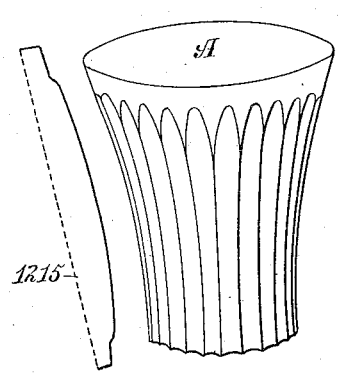
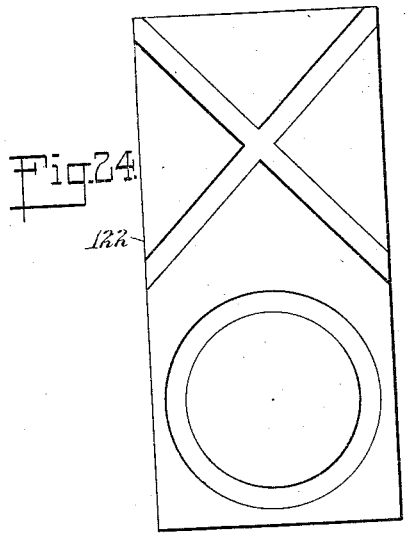
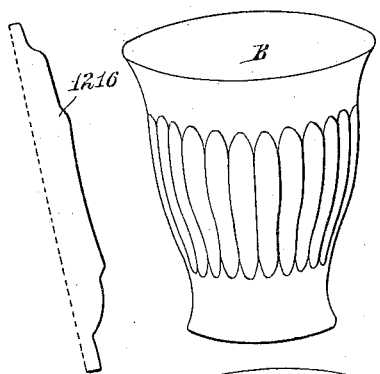
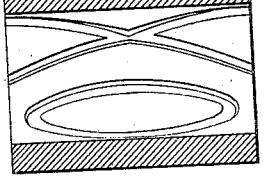
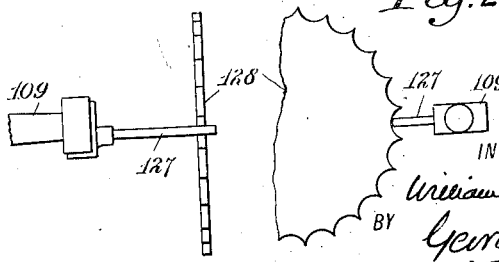

W. A. WARMAN.
ENGRAVING MACHINE.
APPLICATION FILED JAN. 16, 1911.

1,013,343.

Patented Jan. 2, 1912.
9 SHEETS—SHEET 9.

WITNESSES
R. N. Flint.
A. V. Walsh.

INVENTOR
William A. Warman
BY George Book
ATTORNEY

UNITED STATES PATENT OFFICE.

WILLIAM A. WARMAN, OF NEW YORK, N. Y., ASSIGNOR TO KELLER MECHANICAL ENGRAVING COMPANY, OF BROOKLYN, NEW YORK, A CORPORATION OF NEW YORK.

ENGRAVING-MACHINE.

1,013,343. Specification of Letters Patent. Patented Jan. 2, 1912.

Application filed January 16, 1911. Serial No. 602,939.

*To all whom it may concern:*

Be it known that I, WILLIAM A. WARMAN, a citizen of the United States, and a resident of New York, borough of Manhattan, in the county of New York and State of New York, have made and invented certain new and useful Improvements in Engraving-Machines, of which the following is a specification.

My invention relates to engraving machines designed to produce a die or mould by the use of a suitable model or pattern, the form and shape of the die being dependent in part upon the outline of the model or pattern and in part upon various features of operation and upon various adjustments of which the machine is capable, as will be hereinafter separately referred to and described, and the object thereof is to provide an improved engraving machine of the type referred to and having the various features of construction and operation hereinafter disclosed.

With the objects above mentioned in view, my invention consists in the improved engraving machine illustrated in the accompanying drawing, described in the following specification, and particularly claimed in the clauses of the concluding claim, and in such variations and modifications thereof as will be obvious to one skilled in the art to which my invention relates.

Figure 4:
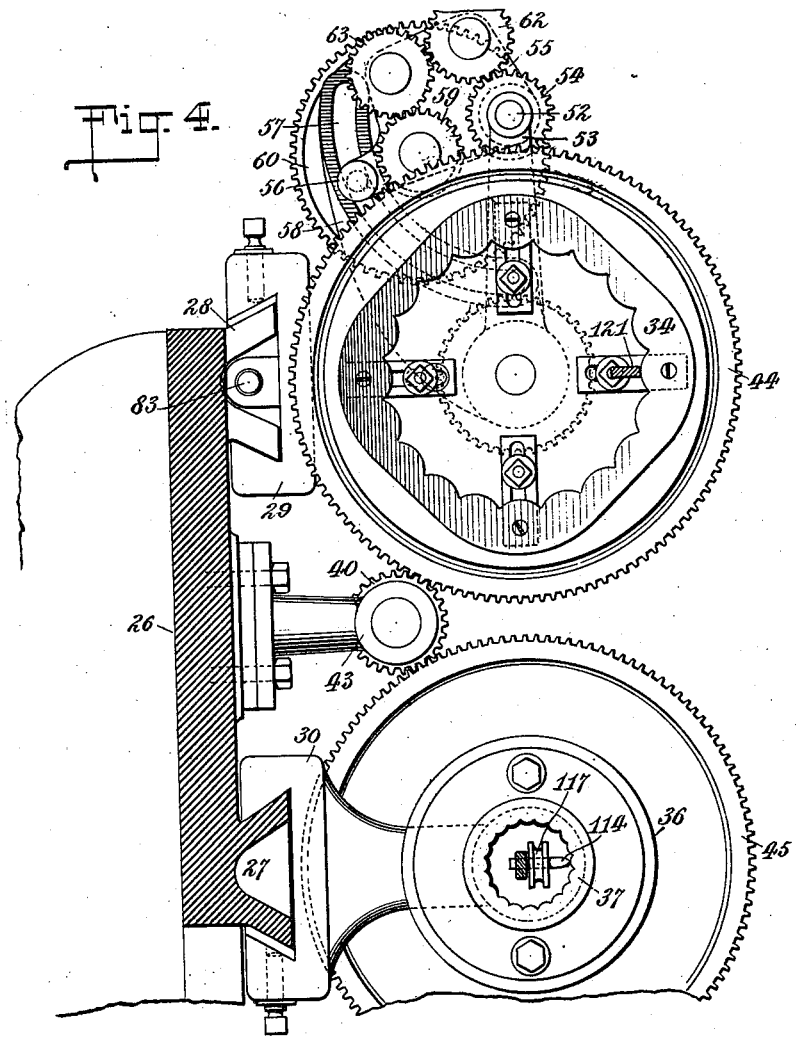
Figure 5:
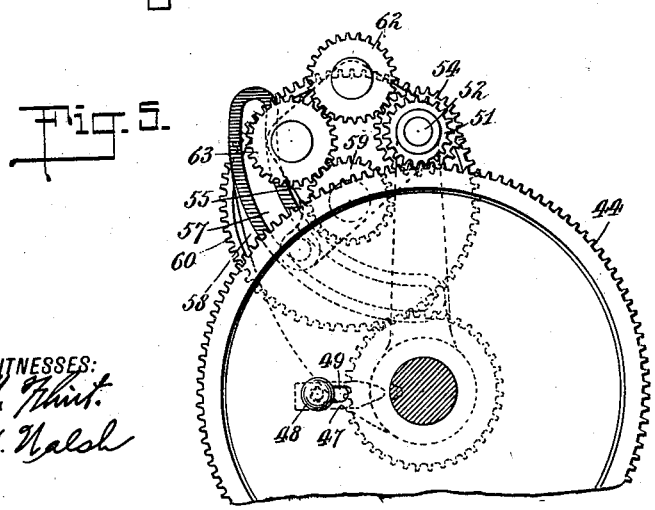
Figure 27:
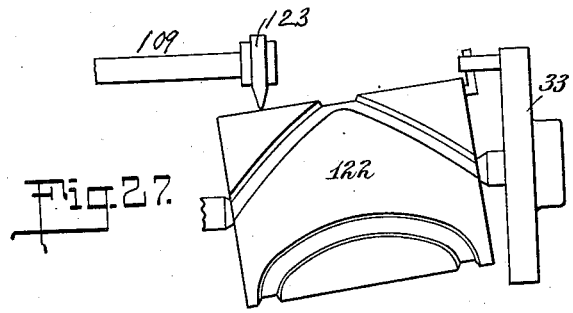
Figure 28:
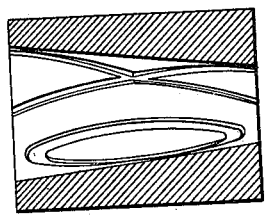
Figure 29:
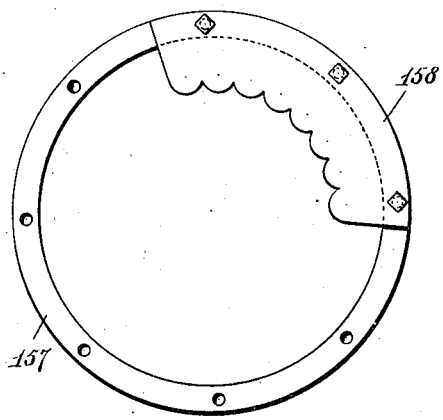

In the drawings accompanying and forming a part of this specification; Figure 1 is a view showing my improved engraving machine in front elevation; Fig. 2 is a view showing the machine in plan; Fig. 3 is a view illustrating certain details of the head and operating means therefor which carries the work to be operated upon; Fig. 4 is an enlarged view showing the die or mold being engraved, a templet for determining the form of the die or mold, and a portion of the mechanism for rotating the die and templet; Fig. 5 is a view illustrating a portion of the mechanism above referred to in another position; Fig. 6 is a view illustrating certain details of the driving mechanism; Figs. 7 and 8 are views further illustrating the same mechanism; Fig. 9 is a view illustrating details of a traveling head which carries the model or pattern; Fig. 10 is a view showing certain link operating mechanism to be hereinafter described; Fig. 11 is a view showing a section of the said link, and various elements coöperating therewith; Fig. 12 is a view illustrating certain clutch mechanism employed in my machine; Fig. 13 is a view illustrating a scheme for operating the clutch by means of electro-magnets; Figs. 14, 15 and 16 are views showing a commutator for controlling the flow of electricity through the controlling electro-magnets referred to; Figs. 17 to 21 are fragmentary and illustrative views used for the purpose of explaining certain features of operation of my machine, each view (with the exception of Fig. 20) showing the tracer and the arm whereby it is carried in plan, and in side elevation, together with a longitudinal central section of the resulting mold; Fig. 22 is a view illustrating a tracer and a tumbler produced by means of a mold produced by using the tracer in my machine; Fig. 22$^a$ is a view illustrating another form of tracer and tumbler; Fig. 22$^b$ is a view showing another form of tumbler produced by the tracer shown in Fig. 22. Figs. 23 to 25 are views illustrating the operation of my machine when a different type of model or pattern is used; Fig. 26 is a view showing a different form of templet and tracer in side elevation; Fig. 26$^a$ is a view showing an end elevation of the same; Figs. 27 and 28 are views similar to Figs. 23 to 25 illustrating a further operation of my machine; and, Fig. 29 is a view illustrating the use of a segmental model in place of a model formed all in one piece.

Referring to the drawings 25 represents a suitable standard or frame upon which the operating elements of my improved engraving machine are carried, the upper end thereof having a vertically extending flat portion 26 upon which are formed two dovetailed guides 27, 28 extending parallel with one another and to which guides two heads 29, 30 are secured, these heads being automatically moved along the guides when the machine is in operation.

The head 29 has a bearing 31 which supports a rotary spindle 32 carrying a face plate 33 at its free end, and this face plate carries a templet 34 in the form of a comparatively thin plate, the edge of which may be regular and concentric to the axis of spindle 32, or of irregular outline as shown in the drawings, and which templet coöperates with a tracer hereinafter described to determine the shape and form of the work produced by the machine; or, in other cases, said face plate carries a model to be reproduced either in its identical form and size, or varied in form or size or both; the operation of the machine, so far as the greater portions of the elements thereof are concerned, being the same whether templet or a model are used.

The head 30 has a bearing which supports a rotary spindle 35 extending parallel with the spindle 32, and a face plate 36 is carried at the end of the spindle 35, to which face plate the work 37 being operated upon by the machine is secured, the machine in the drawings being shown as set up or arranged to produce a fluted design upon the inner surface of a hollow metal mold, the article thus formed being useful as a mold within which glass tumblers, may be pressed or blown, although it will be seen that my machine is capable of general use for reproducing, multiplying, or modifying a pattern impressed upon the templet or model.

The templet and work 37 are driven through the spindles which respectively support them by means of an electric or other type of motor shown at 38 which, through a train of gearing and controlling mechanism therefor to be hereinafter more specifically referred to, operates a shaft 39, see Fig. 13, which shaft may, until the intermediate gearing above referred to is described, be considered as the source of power for operating the spindles 32, 35. The shaft 39, see Fig. 6, drives a long gear or toothed cylinder 40 through bevel gears 41, 42, the gear 40 being supported in bearings 43 carried by brackets secured to the flat portion 26 of the frame or standard of the machine, the said gear being parallel with the spindles 32, 35. The said spindles are provided with gears 44, 45 of the same size in mesh with the long gear 40 and through which the spindles are driven from said gear 40, the gear 45 being permanently connected with the spindle 35 while the gear 44 is provided with a clutch whereby it may be connected with the spindle 32 or disconnected therefrom and permitted to run idle upon the spindle, said clutch being shown as comprising a sliding dog 46 movable radially and adapted when in one position to extend into a recess 47 in the spindle to thus lock the gear and spindle together, and when in another position to clear the recess and permit the gear to run idle upon the spindle, as will be understood from Figs. 5 and 9. A bolt 48 movable in a slot 49 and having a nut 50 permits the movements of the dog 46 referred to and serves as a means for securing the dog in either of the positions mentioned.

The gear 44 is loose upon the spindle 32, but is capable of being connected therewith in order to provide for driving the spindle directly from the gear when the dog 46 is in engagement with the recess. When the gear 44 runs idle upon the spindle, the spindle is driven at a higher speed than the gear, in which case it will be understood that the templet 34 or model carried by the face plate 33 is driven faster than work or die 37.

The gearing whereby the spindle 32 is driven faster than the gear 44 comprises a pinion 51 secured to a shaft 52 rotatable in a bearing 53 supported from the head 29 and which shaft has a gear 54 at its other end.

55 is a spider pivotally supported on the end of the shaft 52 and adjustable about said shaft as a center, said spider being secured in any position within its limits of adjustment by means of a bolt 56 extending therethrough and through a segmental slot 57 in an arm 58 formed with or secured to the head 29, the center about which said slot extends being the axis of the shaft 52. The plate or spider 55 has a bearing for a shaft having a gear 59 at one end and a larger gear 60 at its other end, this gear 60 being adapted to engage a gear 61 fast upon the spindle 32. The plate 55 carries two gears 62, 63 in engagement with one another and in engagement also, respectively, with the gears 54 and 59.

From the above it will be understood that when the gear 44 is arranged to run idle upon the spindle 32, motion will be transmitted through the train comprising the pinion 51 and gears 54, 62, 63, 59, 60 and 61 to the spindle 32, whereby the same will be driven at an increased speed, the ratio with reference to the long gear 40 which drives the gear 44 being dependent upon the size of the gear 60, the slotted arm 58 permitting the use of different diameters of gear 60, and permitting, also, the gear 60 to be moved out of engagement with the gear 61 when the spindle 32 is to be driven directly by the gear 44. Also, by providing the plate 55 with suitable slots different sizes of gears 62, 63 than the sizes shown may be employed, and a speed ratio not depending entirely upon the size of the gear 60 may be obtained. The spindle 32 will in practice, be driven two, three or more times as fast as the spindle 35, the speed ratio being integral.

While I have disclosed a specific form of gearing for operating the spindle 32 indirectly from the gear 44, it will be understood that other forms or arrangements of gearing may be employed so long as the same serves to drive the spindle 32 faster than, and at a definite integral ratio to its speed when driven directly by the gear 44.

The heads 29 and 30 are moved simultaneously upon the guides 28, 27 by mechanism as follows: 64 is a shaft in line with and commonly an extension of the shaft carrying the gear 40, an additional bearing 65 being provided for the free end of the shaft. This bearing together with other elements hereinafter referred to is supported by an arm extending from a supplemental frame 66 secured to the right hand end of the vertical portion 26 of the main frame, and said bearing is extended at 67 so as to form a support for an adjustable plate 68, see Figs. 6 to 8, which carries the gears 69, 70, the plate 68 being secured to the support by means of a bolt 71, said plate having a slot 72 so that gears differing in size from the gears 69, 70, shown, may be substituted for those gears to thereby secure a different speed ratio between the driving shaft 39 and the rate at which the heads 29, 30 are moved, thus providing for different feeds in roughing and finishing operation. The gears 69, 70 are connected so as to form in effect a single gear. The gear 69 is engaged by a gear 73 fast upon the end of the shaft 64, and the gear 70 engages a gear 74 upon a short shaft 75 supported by a bearing at the end of an arm 76, extending from the supplemental frame 66, the other end of which shaft carries a bevel gear 77 which meshes with a second bevel gear 78 upon a shaft supported from the supplemental frame 66 by a bearing member 79. The said shaft has a worm 80 at its other end in engagement with a worm gear 81 running idle upon a shaft 82 supported in suitable bearings in the supplemental frame 66, which shaft is threaded as at 83 to thereby form a feed screw for the upper head 29, the connection between the feed screw and head being shown in Fig. 9. The worm gear 81 is connected with the shaft 82 so as to operate the same by means of a sliding clutch member 84 non-rotatably connected with the shaft by means of a key 85 and having projections 86 adapted to engage and interlock with corresponding projections 87 formed in the worm gear 81.

The mechanism whereby the lower head 30 is moved upon its guide 27 comprises a link 88 having a longitudinally extending slot 89 secured to and movable with a rod 90 guided by guides 91ª, 92ª and the inner end of which is adjustably connected with the head 30 so as to move the same as the link is moved by means of an arm 125 connected with said head and nuts 126, upon the rod 90, which nuts engage the arm 125 and provide for fine adjustment of the head. A block 91, see Figs. 10 and 11, is in sliding engagement with the slot 89, of the link 88, and 92 is a second block secured to the block 91 by means of a stud 93 projecting from the block 92, and a screw and washer, as shown, whereby the blocks while movable as a single unitary structure may be moved angularly with reference to one another as the link is adjusted as hereinafter explained. The second block is movable in a vertical groove 94 formed in the supplemental frame 66, said block being retained in the groove by bars 95 extending partly over the groove as shown in Fig. 11. The second block 92 is moved in the groove 94 by means of a feed screw 96 operated by bevel gears 97, 98 from the shaft 82, the gear 97 being fast upon the said shaft.

From the above it will be seen that as the feed screw 96 is rotated the blocks 92, 91 will be moved vertically with reference to the link 88, and the said link will be moved transverse to the axis of the screw 96 and at a rate dependent upon the angle between the slot 89 of the link and the rod 90, it being remembered that the link moves with the rod while the block 91 slides in the slot of the link.

It will be obvious that as the rate and extent of the movement of the rod 90 and head 30 is dependent upon the angularity of the link 88, the travel of the said head may be varied by varying the inclination of the link, to which end the link is connected with the rod 90 through a clamping member 99 having a circular base resting in a correspondingly formed seat 100 in the link, and which base has slots through which bolts 101 pass, so that the link may be adjusted, angularly, with reference to the clamping member and the two then secured to one another by means of the bolts 101. The clamping member 99 is provided with a split sleeve 102 through which the rod 90 extends, thus permitting the rod and the head 30 to be adjusted relative to the link 88, a bolt 103 being provided to clamp the member 99 to the rod when the parts are properly adjusted.

The mechanism whereby the form or pattern of the work 37 or die formed is determined by the templet 34, or from a model or mandrel when a model is used instead of a templet, comprises a yoke 104 adjustably secured to the left hand end of the vertical portion 26 of the base by means of bolts 105 passing through slots 106 in the yoke and having centers 107 which support a second yoke 108 in such a way that it may oscillate about a vertical axis passing through said centers. The yoke 108 carries two arms 109, 110 each adjustable as to length because of the fact that they are slidable through the bearings 111, 112 in the yoke 108. The yoke 108 carries an electric motor 113 which operates a rotary cutter 114 at the end of the arm 110 by means of a belt 115 passing around guide pulleys 116 and a pulley 117 for operating the cutter. The cutter is held in contact with the work being produced and the model or templet carried by the face plate 33, by means of a cord 118 attached to the end of the arm 110 passing over a fixed support 119 and having a weight 120 at its end.

Considering first the case where a templet 34 is used to determine the form of the mold or die produced, the end of the arm 109 is provided with a tracer 121 which is maintained in contact with the edge of the templet 34 when the machine is in operation, and along which tracer the templet moves as the head 29 is moved, so that the edge of the templet eventually contacts with the tracer along its entire length; and, assuming for the present that the machine is used to produce a fluted pattern upon the inner surface of the mold 37 to thereby form a mold or die within which glass tumblers may be blown, or pressed it will be obvious that as the spindles 32 and 35 are rotated the templet 34 and the work or die 37 will be driven in unison and, for the present explanation, at equal speeds. The tracer 121 being held in contact with the edge of the templet the pattern upon the templet will be reproduced upon the inner surface of the die by means of the rotating cutter 114; furthermore, and because of the fact that both the templet and die are moved longitudinally, the pattern upon the edge of a thin templet is lengthened so as to occupy the entire inner surface of the mold or die, it being remembered that the edge of the templet as it moves to the left, Fig. 2, comes into contact, progressively, with every point of a tracer, 121, the length of which is equal to or greater than the length of the mold or die to be cut.

While I have shown the templet as in the form of a thin plate having an opening with a tracer operating within said opening, I use in some cases a templet with a tracer in contact with its periphery, as shown in Figs. 26 and 26ª where 127 is a tracer coacting with the outer edge of a templet 128, the pattern to be reproduced being, in this case, upon the periphery of the templet.

In case the edge of the tracer 121, which contacts with the edge of the templet is straight and extends parallel with the axis of the arm 109, as shown in Fig. 17, the mold or die 37 produced will be cylindrical in form, or otherwise stated, of uniform internal diameter throughout its entire length.

By varying the inclination and shape of the tracer 121 a large number of patterns may be formed upon the inner surface of a mold or die carried by the face plate 36 from a single templet, and by using different forms of templet the number of patterns may be further multiplied, all, however, being for the present assumed to be of a fluted or recurrent form. Thus if the tracer lies in a plane perpendicular to the axis about which the yoke 108 oscillates and extends at an angle to the arm 109, and if the edge thereof which contacts with the templet is straight, as shown at 1211 Fig. 18, the mold or die 371 produced will be tapering in form with straight flutes, the angle of the sides being obviously dependent upon the inclination of the tracer.

If the tracer lies in a plane inclined to the axis about which the yoke 108 oscillates and extends parallel with the arm 109, and if the edege thereof which contacts with the templet is straight, as shown at 1212, Fig. 19, the mold or die 372 produced will be of uniform internal diameter but the flutes will extend in a spiral direction over the surface of the die.

If the tracer 1212 be curved as shown at 1213, Fig. 20, the angle of the spiral flutes will obviously vary continuously throughout the length of the die or mold, and the mold or die may obviously be made tapering by inclining the tracer with reference to the arm 109 as at 1214, Fig. 21.

The edge of the tracer in contact with the templet in the case above considered is straight in each instance. The edge of the tracer which contacts with the templet may, however, assume a form other than straight, in which case forms of mold or die other than cylindrical or tapered will be produced. Thus in Fig. 22, and without illustrating the mold or die, the tracer 1215 may be used to produce a mold for the manufacture of the tumbler A, and the tracer 1216 Fig. 22ª one for the tumbler B, the same templet 34 as in the above cases being used; and either of these tracers, and any other irregularly shaped tracer, may be made to produce tapering molds, or molds of spiral form, by inclining the tracer in a manner obvious from what is above disclosed.

The designs or patterns transferred to the mold or die in each of the above mentioned cases contemplate one and the same templet 34 of the form illustrated. Obviously the shape of the individual flutes may be changed by using a templet the contacting edge of which differs in contour from that of the templet 34.

The explanation thus far contemplates that the templet and work being produced rotate at the same speed. If the templet rotates at twice the speed of the work, the pattern determined by the shape or form of the edge of the templet will be repeated twice in the surface of the mold or die, the result being a mold or die having twice the number of flutes present in the templet, and so on for any integral speed ratio between the templet and the mold or work being produced.

The explanation thus far has assumed that the templet 34 and the mold or die 37 have moved with reference to the tracer and cutter at equal speeds, in which case the mold or die produced corresponds in length with the lateral movement of the templet, or with the length of tracer along which the templet has been moved. The link 88, however, as above explained, enables the travel of the lower head carrying the die to be varied with reference to the travel of the upper head 29 carrying the templet, the result of which is to vary the length of the mold or die produced. Thus if the mold or die be moved through a greater distance than the templet travels, the mold will be longer than the length of tracer transversed by the templet, although its outline will still be determined by the shape of the templet. Conversely, and referring to the tumbler C shown in Fig. 22$^b$, its mold is produced by means of the same tracer 1215 used to produce the mold for the tumbler A, the mold, however, being advanced at about half the rate that the templet is advanced.

It will be obvious that the diameter of the mold produced in all the above mentioned cases will be dependent upon the relative lengths of the arms 109, 110; and that if the head 30 be originally placed farther to the right, Fig. 1, the clamping member 99 permitting such an adjustment as explained, the mold produced will be of much greater diameter than is the case when the parts are in the position shown.

In case the edge of the templet which contacts with the tracer is concentric with its axis of rotation the form or shape of the mold will be determined entirely by the form of the edge of the tracer, the mold being in such cases of the form imparted to the tracer but without flutes.

In a class of cases equally numerous to the cases above referred to, that is where a more or less irregular pattern is to be reproduced either once or a plurality of times upon the inner surface of a hollow mold, I provide a mandrel 122; Figs. 23 and 24 having any design whatever engraved or otherwise produced upon its periphery either in relief or in intaglio, the said mandrel being carried by the face plate 33. The arm 109 when such a pattern is used is provided with a pointed member 123 in the form of a stud which takes the place of the tracer 121, and which follows the pattern upon the surface of the mandrel as the same rotates and moves longitudinally. The cutter 114 operates within the mold or die as in the example heretofore, the die produced being shown in Fig. 25, so that a mold is produced within which articles of glassware may be blown or pressed. Fig. 24 shows the mandrel 122 developed.

The internal diameter of the mold produced with reference to the diameter of the mandrel is obviously dependent upon the lengths of the arms 109, 110, as above explained; the length of the mold relative to the length of the mandrel is dependent upon the angular position in which the link 88 is secured upon the operating rod 90; and whether the pattern upon the periphery of the mandrel be reproduced upon the inner surface of the mold one or a plurality of times depends upon whether the mandrel and mold rotate at the same speed, or the mandrel two, three or more times as fast as the mold.

While the mandrel above referred to is in the form of a cylinder, the pattern may be impressed upon a mandrel of spherical, ovate, ellipsoidal, or other form, the inner surface of the die produced being similarly curved in such cases.

It will be understood that if the mandrel 122 be supported in an inclined position, as illustrated in Fig. 27, that is, on offset centers, the resulting mold will have a corresponding taper, the pattern or design upon the mandrel occurring one or more times upon its inner surface, as illustrated in Fig. 28.

It will be understood that if the stud 123 be arranged to operate upon the outside of a blank the pattern upon the mandrel 122 will be reproduced one or more times upon the exterior surface thereof, from which it follows that if the mandrel and blank rotate at the same speed the mandrel may be replaced by a solid of any form whatever, for example, a statuette, and the machine in such a case becomes a copying or reproducing machine, the copy being enlarged or reduced in size according to the adjustment of the arm carrying the stud and cutter.

The clutch mechanism between the motor 38 and the shaft 39 hereinbefore referred to, comprises a shaft 130, driven from the motor 38 through worm gearing at 131, a second shaft 132 which drives the shaft 39 through worm gearing at 133, and two pairs of gears 134, 135 and 136, 137, either of which pairs may drive the shaft 132, but the speed at which said shaft is thus driven being greater when the pair 134, 135 are driving, than when the pair 137, 136 are in use.

The gears 134, and 137 are both loose upon the shaft 130, and each is provided with a clutch member 138, 139 through which it may be driven. Coöperating with the clutch members 138, 139 is a clutch member 140 having faces adapted to engage and drive the clutch members 138, 139, said member being slidable upon the shaft 130 but non-rotatably secured thereto as by the key 141 which fits in a keyway in the member 140.

An arm 142 pivoted at 143 is in operative engagement with the clutch member 140, and 144, 145 are two electro-magnets adapted to move the clutch member 140 into operative engagement with the clutch members 138, 139 by means of the operating arm 142.

The electro-magnets 144, 145 are energized alternately by means of electricity derived from any source as illustrated, conventionally, by the battery 146, and 147 is a commutator adapted to control the flow of electricity from the source 146 through either of two circuits in which, respectively, the electro-magnets 144, 145 are included.

The commutator 147 is secured to and rotates in unison with the spindle 32, and the same is provided with three contact rings 148, 149, 150, upon which a corresponding number of brushes bear, the brushes being supported by an arm 151. The contact ring 148 is continuous, while the contact rings 149, 150 are both interrupted, the longer one, 149, extending through about three-fourths of the circumference of the commutator, while the shorter one, 150, extends through about one-fourth of the circumference of the commutator in the case assumed hereinafter, although the portions of the circumference occupied by each ring may be varied by adjusting the rings as hereinafter disclosed.

The rings 149, 150, are each made up of two parts, one part of each ring being secured to the insulating body portion 151, and to the head 153 which is in effect a part of said body portion; while the other portion of each ring is secured to a ring 152 adjustable circumferentially to vary the length of the rings 149, 150; the arrangement of the parts of the rings upon the body portion and adjusting ring being such that their length varies inversely, the ring 149 being in its longest or most extended condition at the time that the ring 150 is shortest. The continuous ring 148 is held in place by a head 154 secured to the body portion by screws as shown. Obviously, by loosening the nut 155 the ring 152 may be adjusted circumferentially to simultaneously lengthen one ring, as 149, and shorten the other as above disclosed. The two parts of each ring, being in contact with one another, form in effect a single continuous ring when the parts are clamped together by tightening the nut 155.

The ring 148 is electrically connected with both the rings 149, 150 so that a current may flow from the ring 148, through either of the rings, 149, 150, according to the position of the commutator, but obviously not through both at the same time, and to the electromagnets 145 and 144, respectively. From this it will be seen that the longer ring 149 is in circuit with the lower electro-magnet 145, and that when the same is energized, the shaft 39 will be driven rapidly through the gears 134, 135, while the commutator is rotating through about three-fourths of a revolution; conversely, when the shorter ring 150 permits current to flow through the upper electro-magnet 144 the shaft 39 will be driven slowly through the gears 137, 136, while the commutator is rotating about one-fourth of a revolution.

Obviously, by adjusting the rings as explained, the portions of a revolution of the commutator, and of the spindle 32 as will be understood, during which the rate of rotation is alternately fast and slow, may be varied.

A spring 156 is preferably provided for the purpose of balancing the arm or lever 142, so that the same force will be sufficient to move it either upward or downward.

The purpose of the mechanism above described for intermittently increasing the rate at which the spindle 32 is driven, is to enable a model or templet extending throughout less than a complete circumference to be used, the resulting mold, however, being engraved throughout its entire circumference. Thus, referring to Fig. 29, 157 is a support to be secured to the face plate 33 and of a form such that a pattern extending through a part only of the circle, as through about 90° in the example shown, may be secured thereto. In Fig. 29, I have shown the pattern 158 as in the form of a segment of a templet similar to the templet 34, although a segment of a mandrel similar to the mandrel 122 may be used, a tracer 121 being used in one case and a tracer point 123 in the other.

From the above it will be understood that when the machine is reproducing from a segment a part only of the die is acted upon by the rotary cutter during each rotation thereof, the cutter being held out of contact with the die during the remaining portion of its rotation. In the example illustrated, and assuming that the die and model rotate at equal speeds, the die is formed in quarters, the model being shifted and secured in a new position after each quarter of the die is formed.

As the tracer and cutter are in contact with a model and the die being formed during a portion only of a rotation of each, much time is consumed as the model and die are advanced through the three-fourths of a rotation during which the die is not being engraved, and the mechanism above disclosed for speeding up the model and die during this portion of each rotation is provided in order to reduce this lost time to a minimum; the effect being that the model and die are advanced slowly through one-fourth of a rotation while a like part of the die is being formed, and then rapidly through the remaining three-fourths of the rotation during which the die is not being engraved.

While I have illustrated the die as being formed one-fourth at a time, any other fractional part may obviously be formed at one time, the adjustable rings of the commutator making it possible to divide the times of slow and fast speed in various proportions.

A single segmental model may be shifted in position upon its support, in which case the pattern of the model is transferred to each fractional part of the mold; or the models used successively may, as an entirety, constitute the pattern, in which case the portions of the mold formed in succession are not similar to one another, the entire surface of the mold being made up of the several dissimilar patterns upon the successive model segments used.

Having thus described my invention and explained the operation thereof, I claim and desire to secure by Letters Patent:

1. In a machine of the class described, a templet in the form of a thin plate; means for simultaneously rotating said templet and for moving the same along its axis of rotation; a tracer in engagement with the edge of said templet, and the length of which is greater than the thickness of said templet, the same being fixed with reference to the longitudinal movement of said templet so that said templet contacts with said tracer throughout its entire length; a work support; means for simultaneously rotating said work support and for moving the same along its axis of rotation; a rotary cutter adapted to operate upon work carried by said work support; and means whereby motion imparted to said tracer, due to the contact of said templet therewith, is transmitted to said rotary cutter.

2. In a machine of the class described, a templet in the form of a thin plate; means for simultaneously rotating said templet and for moving the same along its axis of rotation; an oscillatory yoke; an arm carried by said yoke; a tracer at the free end of said arm and in engagement with the edge of said templet, and the length of which is greater than the thickness of said templet, said tracer being fixed with reference to the longitudinal movement of said templet so that said templet contacts with said tracer throughout its entire length; a work support; means for simultaneously rotating said work support and for moving the same along its axis of rotation; a second arm carried by said yoke; and a rotary cutter at the free end of said second arm and adapted to operate upon work carried by said work support.

3. In a machine of the class described, a templet in the form of a thin plate, the edge of which is irregular and constitutes a pattern to be transferred; means for simultaneously rotating said templet and for moving the same along its axis of rotation; a tracer in engagement with the edge of said templet, and the length of which is greater than the thickness of said templet, the same being fixed with reference to the longitudinal movement of said templet so that the said templet contacts with said tracer throughout its entire length; a work support; means for simultaneously rotating said work support and for moving the same along its axis of rotation; a rotary cutter adapted to operate upon work carried by said work support; and means whereby motion imparted to said tracer, due to variations in the form of the edge of said templet, is transmitted to said rotary cutter.

4. In a machine of the class described, a templet in the form of a thin plate, the edge of which is irregular, and constitutes a pattern to be transferred; means for simultaneously rotating said templet and for moving the same along its axis of rotation; an oscillating yoke; an arm carried by said yoke; a tracer at the free end of said arm and in engagement with the edge of said templet, and the length of which is greater than the thickness of said templet, said tracer being fixed with reference to the longitudinal movement of said templet so that said templet contacts with said tracer throughout its entire length; a work support; means for simultaneously rotating said work support and for moving the same along its axis of rotation; a second arm carried by said yoke; and a rotary cutter at the free end of said second arm and adapted to operate upon work carried by said work support.

5. In a machine of the class described, a rotary support adapted to carry a templet in the form of a thin plate; means for moving said support along its axis of rotation; a tracer in engagement with the edge of said templet, and the length of which is greater than the thickness of said templet, the same being fixed with reference to the longitudinal movement of said templet so that said templet contacts with said tracer throughout its entire length; a rotary work support; means for moving said work support longitudinally of its axis of rotation; means for simultaneously rotating said model support and said work support in definite relation with one another; mechanism whereby said model support moving means and said work support moving means are simultaneously operated, said mechanism including means for varying the longitudinal movement imparted to one of said supports relative to the corresponding movement imparted to the other; a rotary cutter adapted to operate upon work carried by said work support; and means whereby motion imparted to said tracer, due to the contact of said templet therewith, is transmitted to said rotary cutter.

6. In a machine of the class described, a rotary support adapted to carry a templet in the form of a thin plate; means for moving said support along its axis of rotation; a tracer in engagement with the edge of said templet, and the length of which is greater than the thickness of said templet, the same being fixed with reference to the longitudinal movement of said templet so that said templet contacts with said tracer throughout its entire length; a rotary work support;

means for moving said work support longitudinally of its axis of rotation; mechanism for simultaneously rotating said model support and said work support, said mechanism including means whereby said model support may be rotated a plurality of times as fast as said work support; mechanism whereby said model support moving means and said work support moving means are simultaneously operated; a rotary cutter adapted to operate upon work carried by said work support; and means whereby motion imparted to said tracer, due to the contact of said templet therewith, is transmitted to said rotary cutter.

7. In a machine of the class described, a rotary support adapted to carry a templet in the form of a thin plate; means for moving said support along its axis of rotation; a tracer in engagement with the edge of said templet, and the length of which is greater than the thickness of said templet, the same being fixed with reference to the longitudinal movement of said templet so that said templet contacts with said tracer throughout its entire length; a rotary work support; means for moving said work support longitudinally of its axis of rotation; mechanism for simultaneously rotating said model support and said work support, said mechanism including means whereby said model support may be rotated a plurality of times as fast as said work support; mechanism whereby said model support moving means and said work support moving means are simultaneously operated, said mechanism including means for varying the longitudinal movement imparted to one of said supports relative to the corresponding movement imparted to the other; a rotary cutter adapted to operate upon work carried by said work support; and means whereby motion imparted to said tracer, due to the contact of said templet therewith, is transmitted to said rotary cutter.

8. In a machine of the class described, a rotary support adapted to hold a pattern; means for moving said pattern support longitudinally of its axis of rotation; a rotary work support; means for moving said work support longitudinally of its axis of rotation; means for simultaneously rotating said pattern support and said work support in definite relation with one another; mechanism whereby said pattern support moving means and said work support moving means are simultaneously operated, said mechanism including means for varying the longitudinal movement imparted to one of said supports relative to the corresponding movement imparted to the other; a rotary cutter adapted to operate upon work carried by said work support; a member adapted to contact with the pattern aforesaid; and means for transmitting motion imparted to said member due to irregularities in the pattern to said rotary cutter.

9. In a machine of the class described, a rotary support adapted to hold a pattern; means for moving said pattern support longitudinally of its axis of rotation; a rotary work support; means for moving said work support longitudinally of its axis of rotation; mechanism for simultaneously rotating said model support and said work support, said mechanism including means whereby said pattern support may be rotated a plurality of times as fast as said work support; mechanism whereby said pattern support moving means and said work support moving means are simultaneously operated; a rotary cutter adapted to operate upon work carried by said work support; a member adapted to contact with the pattern aforesaid; and means for transmitting motion imparted to said member, due to irregularities in the pattern, to said rotary cutter.

10. In a machine of the class described, a rotary support adapted to hold a pattern; means for moving said pattern support longitudinally of its axis of rotation; a rotary work support; means for moving said work support longitudinally of its axis of rotation; mechanism for simultaneously rotating said pattern support and said work support, said mechanism including means whereby said pattern support may be rotated a plurality of times as fast as said work support; mechanism whereby said pattern support moving means and said work support moving means are simultaneously operated, said mechanism including means for varying the longitudinal movement imparted to one of said supports relative to the corresponding movement imparted to the other; a rotary cutter adapted to operate upon work carried by said work support; a member adapted to contact with the pattern aforesaid; and means for transmitting motion imparted to said member due to irregularities in the pattern to said rotary cutter.

11. In a machine of the class described, a rotary support adapted to hold a pattern; means for moving said pattern support longitudinally of its axis of rotation; a rotary work support; means for moving said work support longitudinally of its axis of rotation; means for simultaneously rotating said pattern support and said work support in definite relation with one another; mechanism whereby said pattern support moving means and said work support moving means are simultaneously operated, said mechanism including means for varying the longitudinal movement imparted to one of said supports relative to the corresponding movement imparted to the other; an oscillatory yoke; an arm carried by said yoke; a member at the free end of said arm and adapted to contact with the pattern aforesaid; a second arm carried by said yoke; and a rotary cutter at the free end of said second arm and adapted to operate upon work carried by said work support.

12. In a machine of the class described, a rotary support adapted to hold a pattern; means for moving said pattern support longitudinally of its axis of rotation; a rotary work support; means for moving said work support longitudinally of its axis of rotation; mechanism for simultaneously rotating said pattern support and said work support, said mechanism including means whereby said pattern support may be rotated a plurality of times as fast as said work support; mechanism whereby said pattern support moving means and said work support moving means are simultaneously operated; an oscillatory yoke; an arm carried by said yoke; a member at the free end of said arm and adapted to contact with the pattern aforesaid; a second arm carried by said yoke; and a rotary cutter at the free end of said second arm and adapted to operate upon work carried by said work support.

13. In a machine of the class described, a rotary support adapted to hold a pattern; means for moving said pattern support longitudinally of its axis of rotation; a rotary work support; means for moving said work support longitudinally of its axis of rotation; mechanism for simultaneously rotating said pattern support and said work support, said mechanism including means whereby said pattern support may be rotated a plurality of times as fast as said work support; mechanism whereby said pattern support moving means and said work support moving means are simultaneously operated, said mechanism including means for varying the longitudinal movement imparted to one of said supports relative to the corresponding movement imparted to the other; an oscillatory yoke; an arm carried by said yoke; a member at the free end of said arm and adapted to contact with the pattern aforesaid; a second arm carried by said yoke; and a rotary cutter at the free end of said second arm and adapted to operate upon work carried by said work support.

14. In a machine of the class described, a movable head; a rotary spindle carried thereby and adapted to support a pattern; a second movable head; a rotary spindle carried thereby and adapted to support work to be operated upon; means for simultaneously rotating said spindles in definite relation with one another; guiding means whereby said heads are constrained to move parallel with one another; mechanism for simultaneously moving said heads, the same including a link, a block in engagement with said link, means for moving one of said members relative to the other, and means for varying the inclination of the link relative to the direction of movement of the head; a rotary cutter adapted to operate upon the work; a member adapted to contact with the pattern aforesaid; and means for transmitting motion imparted to said member due to irregularities in the pattern to said rotary cutter.

15. In a machine of the class described, a movable head; a rotary spindle carried thereby and adapted to support a pattern; a second movable head; a rotary spindle carried thereby and adapted to support work to be operated upon; means for simultaneously rotating said spindles in definite relation with one another; guiding means whereby said heads are constrained to move parallel with one another; mechanism for simultaneously moving said heads, the same including a link operatively connected with and inclined with reference to the line of movement of one said members, a movable block in operative engagement with said link, and means for varying the inclination of said link relative to the line of travel of said block; a rotary cutter adapted to operate upon the work; a member adapted to contact with the pattern aforesaid; and means for transmitting motion imparted to said member, due to irregularities in the pattern, to said rotary cutter.

16. In a machine of the class described, a movable head; a rotary spindle carried thereby and adapted to support a pattern; a second movable head; a rotary spindle carried thereby and adapted to support work to be operated upon; mechanism for simultaneously rotating said spindles, said mechanism including means for rotating said pattern supporting spindle a plurality of times as fast as said work supporting spindle; guiding means whereby said heads are constrained to move parallel with one another; mechanism for simultaneously moving said heads, the same including a link, a block in engagement with said link, means for moving one of said members relative to the other, and means for varying the inclination of the link relative to the direction of movement of the head; a rotary cutter adapted to operate upon the work; a member adapted to contact with the pattern aforesaid; and means for transmitting motion imparted to said member, due to irregularities in the pattern, to said rotary cutter.

17. In a machine of the class described, a movable head; a rotary spindle carried thereby and adapted to support a pattern; a second movable head; a rotary spindle carried thereby and adapted to support work to be operated upon; mechanism for simultaneously rotating said spindles, said mechanism including means for rotating said pattern supporting spindle a plurality of times as fast as said work supporting spindle; guiding means whereby said heads are constrained to move parallel with one another; mechanism for simultaneously moving said heads, the same including a link operatively connected with and inclined with reference to the line of movement of one of said members, a movable block in operative engagement with said link, and means for varying the inclination of said link relative to the line of travel of said block; a rotary cutter adapted to operate upon the work; a member adapted to contact with the pattern aforesaid; and means for transmitting motion imparted to said member, due to irregularities in the pattern, to said rotary cutter.

18. In a machine of the class described, a movable head; a rotary spindle carried thereby and adapted to support a pattern; a second movable head; a rotary spindle carried thereby and adapted to support work to be operated upon; means for simultaneously rotating said spindles in definite relation with one another; guiding means whereby said heads are constrained to move parallel with one another; mechanism for simultaneously moving said heads, the same including a link, a block in engagement with said link, means for moving one of said members relative to the other, and means for varying the inclination of the link relative to the direction of movement of the head; an oscillatory yoke; an arm carried by said yoke; a member at the free end of said arm and adapted to contact with the pattern aforesaid; a second arm carried by said yoke; and a rotary cutter at the free end of said second arm and adapted to operate upon work carried by said work support.

19. In a machine of the class described, a rotary support adapted to hold a pattern, a rotary work support; means for simultaneously rotating said pattern support and said work support in definite relation with one another; a rotary cutter adapted to operate upon the work; a member adapted to contact with the pattern aforesaid; means for transmitting motion imparted to said member, due to irregularities in the pattern, to said rotary cutter; and a motor carried by said transmitting means and operatively connected with said rotary cutter.

20. In a machine of the class described, a rotary support adapted to hold a pattern; a rotary work support; means for simultaneously rotating said pattern support and said work support in definite relation with one another; an oscillatory yoke; an arm carried by said yoke; a member at the free end of said arm and adapted to contact with the pattern aforesaid; a second arm carried by said yoke; a rotary cutter at the free end of said second arm and adapted to operate upon work carried by said work support; and a motor carried by said yoke and operatively connected with said rotary cutter.

21. In a machine of the class described, a rotary support adapted to hold a pattern; a rotary work support; means for simultaneously rotating said pattern support and said work support in definite relation with one another; means for periodically increasing the rate at which said pattern and work supports are driven, so that said supports are driven alternately at two different speeds; a rotary cutter adapted to operate upon work carried by said work support; a member adapted to contact with the pattern aforesaid; and means for transmitting motion imparted to said member, due to irregularities in the pattern, to said rotary cutter.

22. In a machine of the class described, a rotary support adapted to hold a pattern; a rotary work support; means for simultaneously rotating said pattern support and said work support in definite relation with one another; means for increasing the rate at which said pattern and work supports are driven during a part of each successive complete rotation of said supports; a rotary cutter adapted to operate upon work carried by said work support; a member adapted to contact with the pattern aforesaid; and means for transmitting motion imparted to said member, due to irregularities in the pattern, to said rotary cutter.

23. In a machine of the class described, a rotary support adapted to hold a pattern; a rotary work support; means, including a clutch and gearing, for simultaneously rotating said pattern support and said work support in definite relation with one another, said gearing being adapted to operate said supports at two different speeds; means for operating said clutch to secure motion of said supports at a definite speed during a portion of a rotation; and means for operating said clutch to secure motion of said supports at a greater speed during the remaining portion of the rotation; a rotary cutter adapted to operate upon work carried by said work support; a member adapted to contact with said pattern aforesaid; and means for transmitting motion imparted to said member, due to irregularities in the pattern, to said rotary cutter.

24. In a machine of the class described, a rotary support adapted to hold a pattern; a rotary work support, means for simultaneously rotating said pattern support and said work support in definite relation with one another, said means including a clutch adapted to drive said supports at two different speeds; means, including an electromagnet for operating said clutch; a commutator driven in unison with one of said supports; brushes in engagement with said commutator; a circuit controlled by said commutator, and which circuit includes said clutch operating means; a rotary cutter adapted to operate upon work carried by said work support; a member adapted to contact with the pattern aforesaid; and means for transmitting motion imparted to said member, due to irregularities in the pattern, to said rotary cutter.

25. In a machine of the class described, a rotary support adapted to hold a pattern; a rotary work support; means for simultaneously rotating said pattern support and said work support in definite relation with one another, said means including a clutch adapted to drive said supports at two different speeds; two electro-magnets, either of which may operate said clutch; a commutator upon said pattern holding support, said commutator comprising a continuous contact ring, two adjustable contact rings, each extending throughout a part only of the circumference of the commutator, and means for varying the length of said two last mentioned contact rings; brushes in contact with said rings; and two circuits controlled by said commutator, and each including one of said two electro-magnets; a rotary cutter adapted to operate upon work carried by said work support; a member adapted to contact with the pattern aforesaid; and means for transmitting motion imparted to said member, due to irregularities in the pattern, to said rotary cutter.

26. In a machine of the class described, a rotary support adapted to hold a pattern; a rotary work support; means for simultaneously rotating said pattern support and said work support in definite relation with one another; means for periodically increasing the rate at which said pattern and work supports are driven, so that said supports are driven alternately at two different speeds; and means for transferring the form of said pattern to work carried by said work support.

27. In a machine of the class described, a rotary support adapted to hold a pattern; a rotary work support; means for simultaneously rotating said pattern support and said work support in definite relation with one another; means for increasing the rate at which said pattern and work supports are driven during a part of each successive complete rotation of said supports; and means for transferring the form of said pattern to work carried by said work support.

28. In a machine of the class described, a rotary support adapted to hold a pattern; a rotary work support; means, including a clutch and gearing, for simultaneously rotating said pattern support and said work support in definite relation with one another, said gearing being adapted to operate said supports at two different speeds; means for operating said clutch to secure motion of said supports at a definite speed during a portion of a rotation; and means for operating said clutch to secure motion of said supports at a greater speed during the remaining portion of the rotation; and means for transferring the form of said pattern to work carried by said work support.

29. In a machine of the class described, a rotary support adapted to hold a pattern; a rotary work support, means for simultaneously rotating said pattern support and said work support in definite relation with one another, said means including a clutch adapted to drive said supports at two different speeds; means, including an electromagnet for operating said clutch; a commutator driven in unison with one of said supports; brushes in engagement with said commutator; a circuit controlled by said commutator, and which circuit includes said clutch operating means; and means for transferring the form of said pattern to work carried by said work support.

30. In a machine of the class described, a rotary support adapted to hold a pattern; a rotary work support; means for simultaneously rotating said pattern support and said work support in definite relation with one another, said means including a clutch adapted to drive said supports at two different speeds; two electro-magnets, either of which may operate said clutch; a commutator upon said pattern holding support, said commutator comprising a continuous contact ring, two adjustable contact rings, each extending throughout a part only of the circumference of the commutator, and means for varying the length of said two last mentioned contact rings; brushes in contact with said rings, and two circuits controlled by said commutator, and each including one of said two electro-magnets; and means for transferring the form of said pattern to work carried by said work support.

31. In a machine of the class described, a suitable supporting frame having two parallel guides; two heads movable one upon each of said guides, and each head carrying a rotary spindle adapted to support, respectively, a pattern and work to be operated upon; means for simultaneously rotating said spindles in definite relation with one another; means for increasing the rate at which said pattern and work supporting spindles are driven during a part of each successive complete rotation of said spindles; a rotary cutter adapted to operate upon work carried by said work support; a member adapted to contact with the pattern aforesaid; and means for transmitting motion imparted to said member, due to irregularities in the pattern, to said rotary cutter.

32. In a machine of the class described, a suitable supporting frame having two parallel guides; two heads movable one upon each of said guides, and each head carrying a rotary spindle adapted to support, respectively, a pattern and work to be operated upon; means including a clutch and gearing for simultaneously rotating said spindles in definite relation with one another, said gearing being adapted to rotate said spindles at two different rates of speeds; means for operating said clutch to secure the rotation of said spindles at a definite speed during a portion of a rotation of said spindles; and means for operating said clutch to secure the rotation of said spindles at a higher rate of speed during the remaining portion of their rotation; a rotary cutter adapted to operate upon work carried by said work support; a member adapted to contact with the pattern aforesaid; and means for transmitting motion imparted to said member, due to irregularities in the pattern, to said rotary cutter.

33. In a machine of the class described, a suitable supporting frame having two parallel guides, and a third guide extending transverse to said parallel guides; two heads movable one upon each of said guides, and each head having a rotary spindle adapted to support, respectively, a pattern and work to be operated upon; means for simultaneously rotating said spindles in definite relation with one another; a feed screw for moving one of said heads; a block guided by the transverse guide aforesaid; a second feed screw operated by said first mentioned feed screw; a rod for moving the other of said heads; a link carried by said rod and adjustable angularly with reference thereto, said block and link being in operative engagement with one another; a rotary cutter adapted to operate upon work carried by said work support; a member adapted to contact with the pattern aforesaid; and means for transmitting motion imparted to said member, due to irregularities in the pattern, to said rotary cutter.

34. In a machine of the class described, a suitable supporting frame having two parallel guides, and a third guide extending transverse to said parallel guides; two heads movable one upon each of said guides, and each head having a rotary spindle adapted to support, respectively, a pattern and work to be operated upon; means for simultaneously rotating said spindles in definite relation with one another; a feed screw for moving one of said heads; a block guided by the transverse guide aforesaid; a second feed screw operated by said first mentioned feed screw; a rod for moving the other of said heads; a link carried by said rod and adjustable angularly with reference thereto, said block and link being in operative engagement with one another; and means for transferring the form of said pattern to work carried by said work support.

35. In a machine of the class described, a suitable supporting frame having two parallel guides, and a third guide extending transverse to said parallel guides; two heads movable one upon each of said guides, and each head having a rotary spindle adapted to support, respectively, a pattern and work to be operated upon; means for simultaneously rotating said spindles in definite rotation with one another; a feed screw for moving one of said heads; a block guided by the transverse guide aforesaid; a second feed screw operated by said first mentioned feed screw; a rod for moving the other of said heads; a link carried by said rod and adjustable angularly with reference thereto, said block and link being in operative engagement with one another; an oscillating yoke; an arm carried by said yoke; a member at the free end of said arm and adapted to contact with the pattern aforesaid; a second arm carried by said yoke; and a rotary cutter at the free end of the said second arm and adapted to operate upon work carried by said work support.

36. In a machine of the class described, a suitable supporting frame having two parallel guides, and a third guide extending transverse to said parallel guides; two heads movable one upon each of said guides, and each head having a rotary spindle adapted to support, respectively, a pattern and work to be operated upon; a gear upon each of said spindles; an elongated gear in engagement with both said gears and the length of which is such that said gears are always in engagement therewith; means for rotating said elongated gear; a feed screw for moving one of said heads; gearing, through which said feed screw is driven from said elongated gear, and whereby the speed at which the said feed screw is driven may be varied; a movable block guided by the transverse guide aforesaid; a second feed screw operated by said first mentioned feed screw, and in operative engagement with said block; a rod for moving the other of said heads; a link carried by said rod and adjustable angularly with reference thereto, said block and link being in operative engagement with one another; a rotary cutter adapted to operate upon work carried by said work support; a member adapted to contact with the pattern aforesaid; and means for transmitting motion imparted to said member, due to irregularities in the pattern, to said rotary cutter.

Signed at New York, borough of Manhattan, in the county of New York, and State of New York, this 11th day of January, A. D. 1911.

WILLIAM A. WARMAN.

Witnesses:
H. M. WHITE,
A. V. WALSH.